United States Patent
Selvan et al.

(10) Patent No.: US 10,092,104 B2
(45) Date of Patent: Oct. 9, 2018

(54) SNAP-IN EDGE TRIM DESIGN FOR END PANELS

(71) Applicant: Heatcraft Refrigeration Products LLC, Richardson, TX (US)

(72) Inventors: Chera Selvan, Columbus, GA (US); Surendran Ramasamy, Dindigul (IN)

(73) Assignee: Heatcraft Refrigeration Products LLC, Richardson, TX (US)

( * ) Notice: Subject to any disclaimer, the term of this patent is extended or adjusted under 35 U.S.C. 154(b) by 0 days.

(21) Appl. No.: 15/346,472

(22) Filed: Nov. 8, 2016

(65) Prior Publication Data
US 2018/0125239 A1     May 10, 2018

(51) Int. Cl.
| | | |
|---|---|---|
| *A47F 3/06* | (2006.01) | |
| *A47B 96/20* | (2006.01) | |
| *A47F 3/04* | (2006.01) | |
| *B29C 47/06* | (2006.01) | |
| *B29C 47/00* | (2006.01) | |
| *B29C 44/12* | (2006.01) | |
| *B29K 75/00* | (2006.01) | |
| *B29K 105/04* | (2006.01) | |
| *B29L 31/00* | (2006.01) | |
| *B29K 27/06* | (2006.01) | |
| *B29K 105/26* | (2006.01) | |
| *B29K 705/00* | (2006.01) | |

(52) U.S. Cl.
CPC .......... *A47B 96/201* (2013.01); *A47B 96/205* (2013.01); *A47B 96/206* (2013.01); *A47F 3/0469* (2013.01); *A47F 3/0482* (2013.01); *B29C 44/1228* (2013.01); *B29C 47/0042* (2013.01); *B29C 47/065* (2013.01); *B29K 2027/06* (2013.01); *B29K 2075/00* (2013.01); *B29K 2105/04* (2013.01); *B29K 2105/26* (2013.01); *B29K 2705/00* (2013.01); *B29L 2031/7232* (2013.01)

(58) Field of Classification Search
CPC ... A47B 96/201; A47B 96/205; A47B 96/206; A47F 3/0469; A47F 3/0482; B29C 44/1228; B29C 47/0042; B29K 2105/26; B29K 2705/00; B29K 2031/7232; F25D 23/063; F25D 23/064; F25D 23/085
USPC .............. 52/309.11, 800.12, 802.1; 312/116; 264/46.4–46.9
See application file for complete search history.

(56) References Cited

U.S. PATENT DOCUMENTS

| | | | | |
|---|---|---|---|---|
| 2,951,613 A | * | 9/1960 | Hardigg | B65D 7/44 217/65 |
| 3,044,658 A | * | 7/1962 | Combs | B65D 7/12 217/69 |
| 3,353,321 A | * | 11/1967 | Heilweil | F25D 23/085 49/478.1 |
| 3,645,821 A | * | 2/1972 | Baumann | B29C 37/0082 15/244.1 |

(Continued)

*Primary Examiner* — Daniel J Troy
*Assistant Examiner* — Timothy M Ayres
(74) *Attorney, Agent, or Firm* — Hubbard Johnston, PLLC

(57) ABSTRACT

An edge trim for display cases, and methods for making edge trim, are described. Instead of using tape or an adhesive to attach trim to the outer rims of end panels, a shape pattern is created in an extruded trim piece. Then polyurethane liquid can be added to the interior of the panel so that it also fills in the shape pattern. When the polyurethane solidifies into foam it will create a tight bond between the panels and the trim pieces.

9 Claims, 5 Drawing Sheets

(56) References Cited

U.S. PATENT DOCUMENTS

| | | | | |
|---|---|---|---|---|
| 3,803,779 | A * | 4/1974 | Kuyper | E06B 3/302 |
| | | | | 52/476 |
| 3,834,101 | A * | 9/1974 | Wilder | E06B 3/78 |
| | | | | 428/122 |
| 4,107,833 | A * | 8/1978 | Knight | E04H 5/10 |
| | | | | 220/592.1 |
| 4,218,848 | A * | 8/1980 | Nelson | E05B 63/10 |
| | | | | 49/503 |
| 4,259,135 | A * | 3/1981 | Kulla | E04F 21/28 |
| | | | | 156/145 |
| 4,424,968 | A * | 1/1984 | Smith | A63B 63/083 |
| | | | | 403/408.1 |
| 4,762,904 | A * | 8/1988 | Nakama | B60J 1/17 |
| | | | | 428/122 |
| 5,289,657 | A * | 3/1994 | Kiel | F25D 23/082 |
| | | | | 49/478.1 |
| 5,941,622 | A * | 8/1999 | Davidson | A47F 3/0469 |
| | | | | 312/400 |
| 8,153,242 | B2 * | 4/2012 | Wallace | B29C 47/0023 |
| | | | | 428/217 |

* cited by examiner

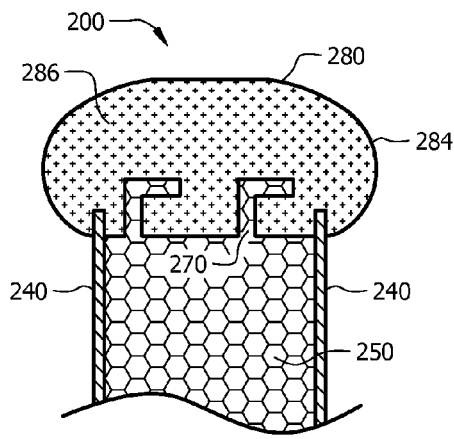
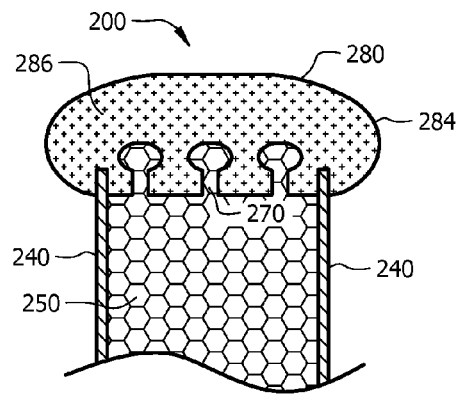
FIG. 5A   FIG. 5B
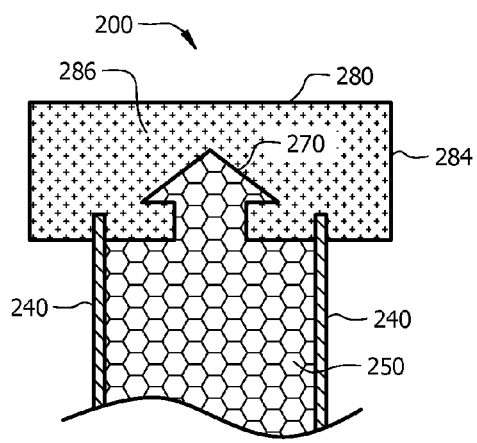
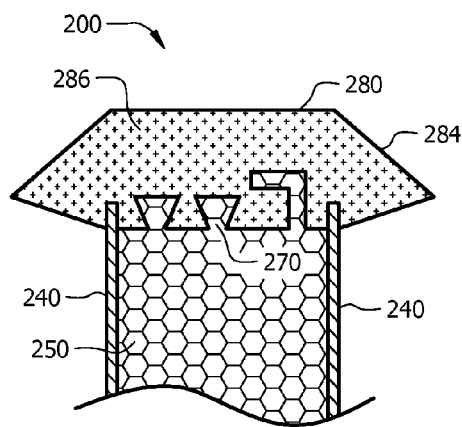
FIG. 5C   FIG. 5D

SNAP-IN EDGE TRIM DESIGN FOR END PANELS

TECHNICAL FIELD

The present disclosure is directed to edge trim for commercial product displays, and in particular to refrigerated display cases.

BACKGROUND OF THE INVENTION

Stores and other establishments display products in a variety of display cases. Such cases can be shelving units of various shapes and sizes. Some products are displayed within refrigerators. Refrigerators and shelving units can be combined, such as open faced refrigeration cases that store refrigerated drinks or other perishable items.

BRIEF SUMMARY OF THE INVENTION

One possible embodiment under the present disclosure comprises an end panel for a display case comprising: two end sheets; a trim body surrounding substantially the entire circumference of the two end sheets, the trim body comprising two slots configured to receive an edge of the two end sheets, the trim body further comprising a shape pattern between the two slots; and a trim skin surround substantially the entire circumference of the trim body; wherein the end panel is configured to receive polyurethane liquid between the two end sheets such that the polyurethane liquid will fill in the shape pattern.

Another possible embodiment under the present disclosure comprises a display case comprising: a plurality of shelves; a plurality of end panels, each of the plurality of end panels comprising: two end sheets; a trim body surrounding substantially the entire circumference of the two end sheets, the trim body comprising two slots configured to receive an edge of the two end sheets, the trim body further comprising a shape pattern between the two slots; and a trim skin surrounding substantially the entire circumference of the trim body; wherein the end panel is configured to receive polyurethane liquid between the two end sheets such that the polyurethane liquid will fill in the shape pattern and solidify into polyurethane foam.

Another possible embodiment under the present disclosure comprises a method of constructing an end panel comprising: providing two end sheets; co-extruding a trim body and a trim skin, the trim body comprising a plurality of slots configured to receive the two end sheets and a shape pattern configured to be disposed between the two end sheets; securing the trim body and the trim skin to substantially the entire perimeter of the two end sheets such that the end sheets are inserted into the plurality of slots and the trim skin is attached to the trim body and distal to the end sheets; injecting polyurethane liquid between the two end sheets such that the polyurethane liquid fills the shape pattern; and allowing the polyurethane liquid to solidify into polyurethane foam.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIGS. 5A-5D are diagrams of shape pattern embodiments under the present disclosure.

DETAILED DESCRIPTION OF THE INVENTION

A variety of display cases are used in stores and other retail establishments. The display cases can take a variety of forms, shapes, sizes, and dimensions. One type of display case is the refrigerated display case. These display cases can be refrigerated themselves, or can merely reside within a refrigerated environment. Refrigerated display cases can at times be subject to unique stresses that non-refrigerated display cases are not subject to. Temperature changes can cause a cycle of expanding and shrinking materials and different materials can expand and shrink at different rates and total amounts. Refrigeration cases can also contain machinery that cause vibrational stresses. Because of these stresses, refrigerated cases can wear down quicker than non-refrigerated embodiments. Innovations that lead to cheaper manufacturing of display cases, especially refrigerated ones, can be of great value.

Figure 1:
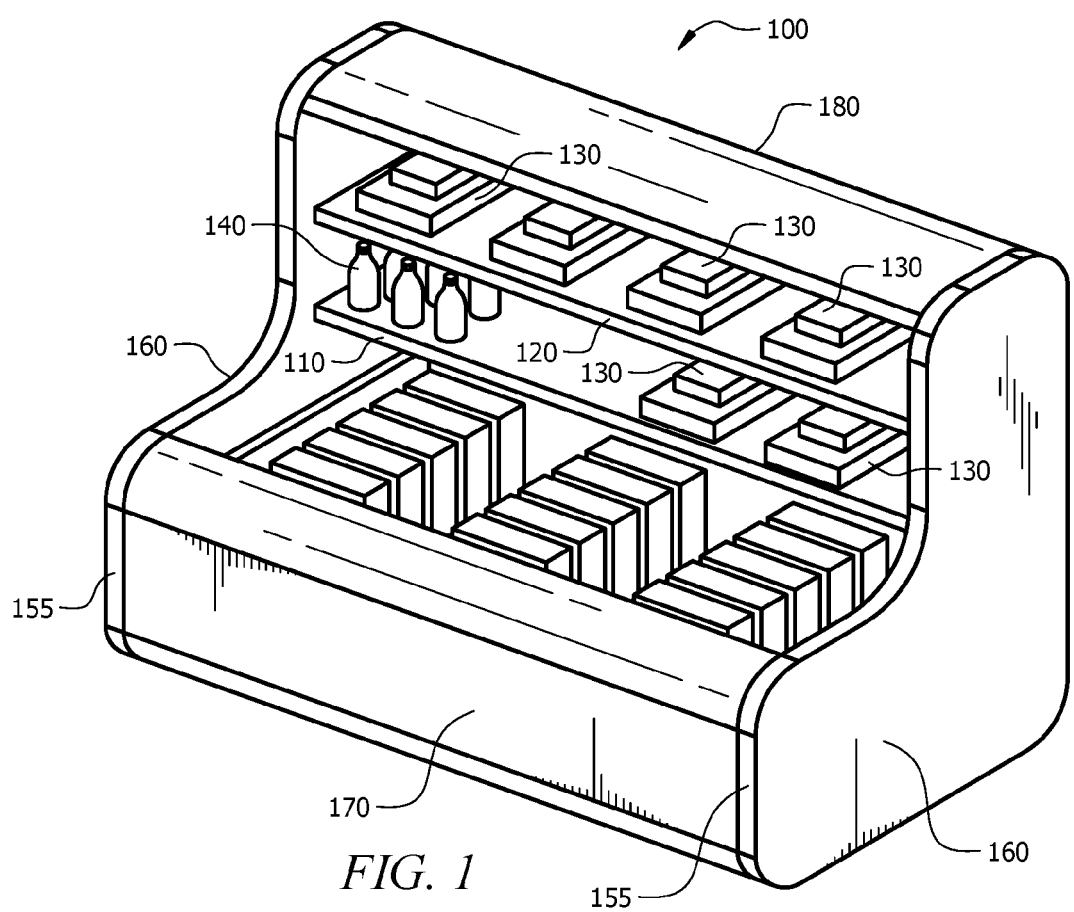
FIG. 1 is a diagram of an embodiment of a display case.

One part of a display case is the trim. A display case can have the appearance of case 100 in FIG. 1. A case 100 can have end panels 160 and front 170 and back panels 180. Shelves 110, 120 can be positioned between the end panels 160. There may even be a freezer section 140, with a sliding lid. Items 130 (such as food, drinks, etc.) can be stored on the shelves 110, 120 or in the freezer section 140 for display to the public. End panels 160 typically comprise a trim 155 along their outer edges. Trim 155 can have decorative purposes, but it also has functional purposes due to the manufacturing process for end panels 160. For a refrigerated unit, end panels 160 may conceal refrigeration equipment (not shown) within case 100.

In general, embodiments of an end panel under the present disclosure and under the prior art, comprise two end sheets, joined along their perimeter by some form of end trim, the end sheets and trim forming a cavity. A foam (such as polyurethane foam) is then injected into the cavity. The term 'end panel' generally refers to an entire end panel comprising two end sheets, trim, and foam. The term 'end sheets' refers to the two sheets (often metal) that go into forming a single end panel.

Figure 2:
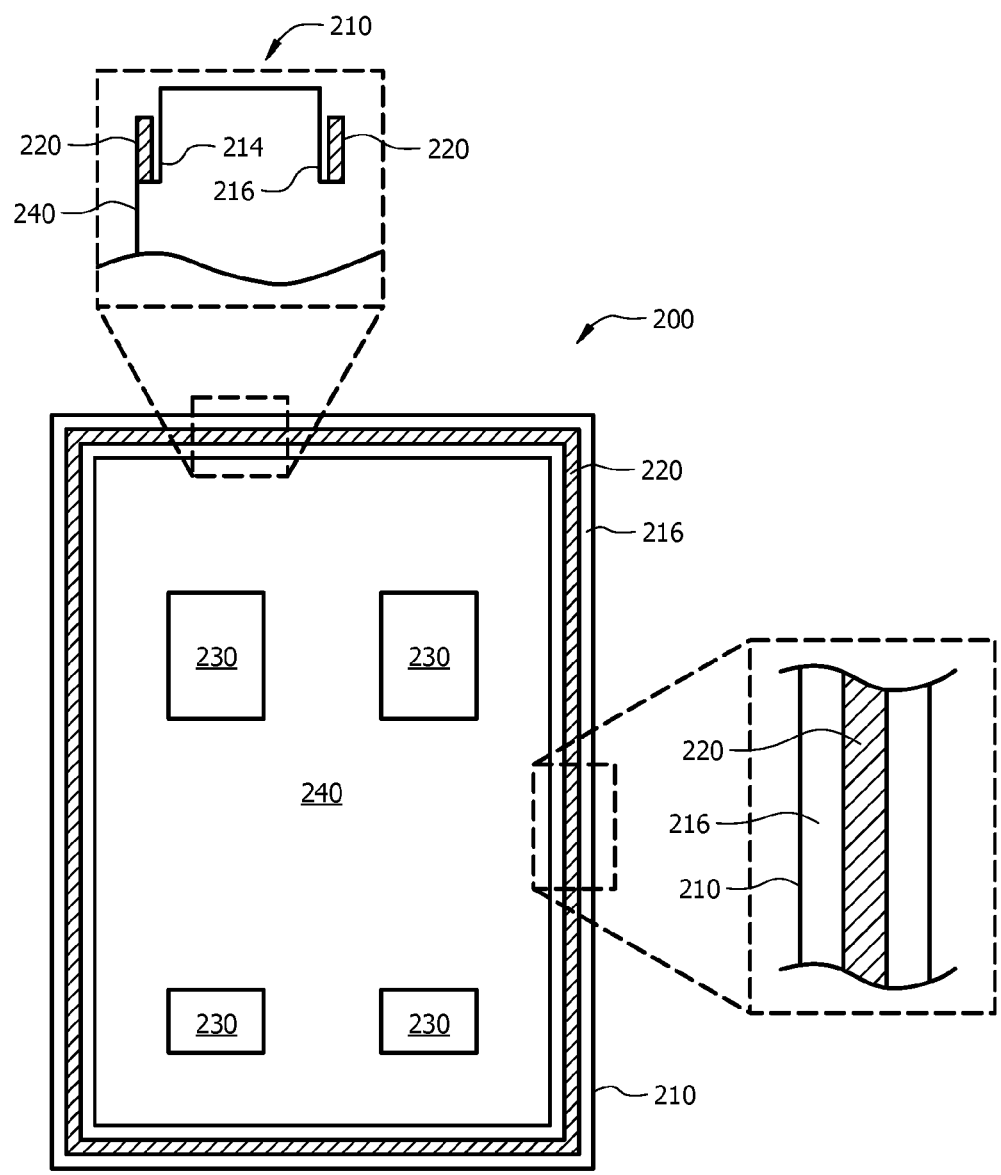
FIG. 2 is a diagram of an embodiment of an end panel during construction.

FIG. 2 displays an embodiment of an end panel 200 midway through construction. End sheet 240 (preferably metal but can be a different material) sits underneath a frame 210. Frame 210 has a C-shaped cross section with the C open toward the interior of the structure. Also shown is a close-up of a side view of frame 210. Double sided tape 220, or another adhesive, is attached to side wings 214, 216 of the C-shaped frame 210 such that it adheres to end sheet 240. End sheet 240 is attached to wing 214 of frame 210 by adhesive 220. Later in the construction process another end sheet 240 will be applied to wing 216 by adhesive 220. A close-up view is shown of frame 210, showing adhesive 220 applied to the face of wing 216. Wooden blocks 230 are often adhered to the end sheets 240 and can be used to receive attachment bolts or other attachment components when connecting neighboring display cases together, or attaching shelving or other components. After applying end sheets 240 to each side of the frame 210, a V-shaped application machine will close on the panel 200 and hold it in place while liquid polyurethane ("PU") is injected into the interior region of panel 200 through an aperture. The aperture can be located in a corner, along a side, along a face, and can be of various sizes or shapes. The aperture can be fitted with various nozzles, fittings or attachments for interoperability with other components, such as the injector. The polyurethane dries and hardens into PU foam, an insulator.

Figure 3:
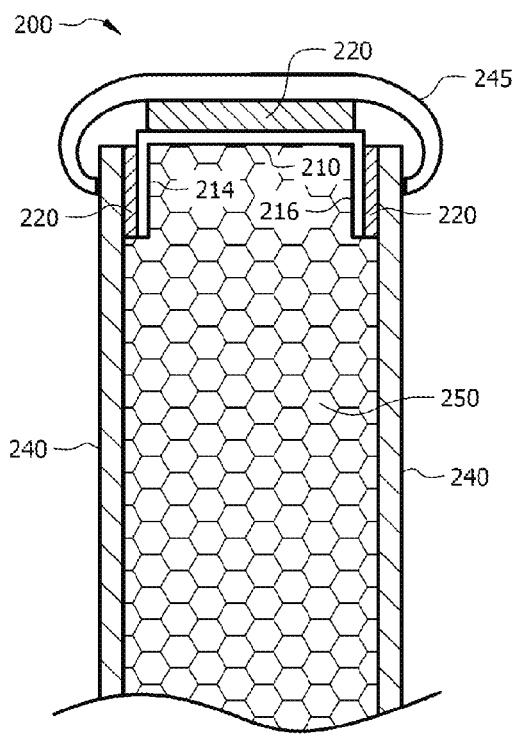
FIG. 3 is a diagram of an embodiment of a prior art end panel.

FIG. 3 shows a portion of a typical prior art end panel 200. PU foam 250 sits between end sheets 240 and C-shaped frame 210. Tape/adhesive 220 helps adhere end sheets 240 to frame 210. Trim 245 is attached to the top edge of frame 210 by tape/adhesive 220. Trim 245 is typically made of extruded PVC (polyvinyl chloride). End panel 200 can be attached to the end of a display case, such as display case 100 of FIG. 1.

There are several problems with the current process of constructing end panels. One is a lot of waste material. The process can also be labor intensive. Previous end panels tend to break down quickly as the attachment mechanisms for the PVC trim (usually tape) tend to be weak. Many warranty claims are made to end panel manufacturers because of end panels that break at the trim, usually when an employee is carrying or adjusting an end panel by holding onto the trim. Thus an end panel trim is needed that is stronger and less expensive to manufacture with less waste.

Figure 4:
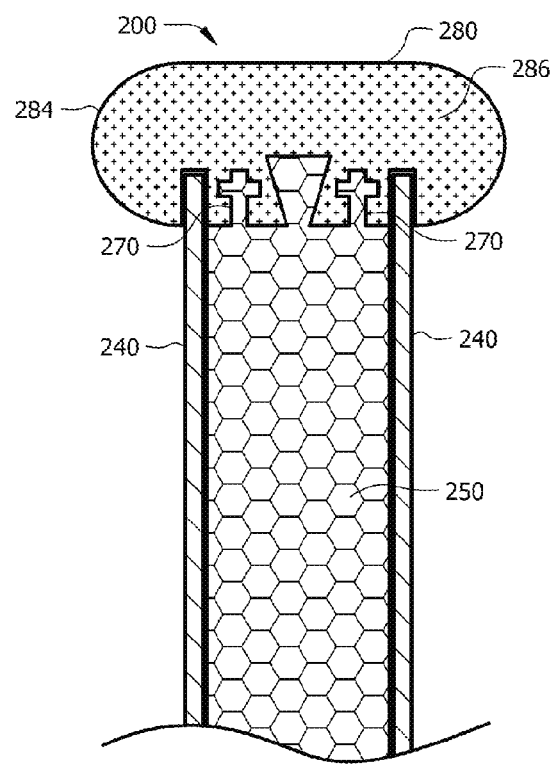
FIG. 4 is a diagram of an end panel embodiment under the present disclosure.

FIG. 4 displays one embodiment of end panel 200 under the present disclosure. Snap-in trip 280 can comprise a shape pattern 270, skin 284, and body 286. Skin 284 is virgin PVC in a preferred embodiment while body 286 can comprise recycled PVC. Trim 280 can be snapped onto end sheets 240. Polyurethane liquid is then injected into the space between the end sheets 240 via a small aperture somewhere along the trim 280 or end sheets 240. As the liquid is injected it will fill the entire cavity defined by the end sheets 240 and the trim 280, and fill shape pattern 270. As the liquid solidifies it will harden into foam 250 and create a tight connection between the foam 250 and trim 280. End panel 200 will then comprise two end sheets 240, PU foam 250, and trim 280. One end panel 200 can be placed on each end of a display case.

Skin 284 in FIG. 4 can be, in a preferred embodiment, virgin PVC. This is because skin 284 will be seen by customers and therefore should have a good appearance. Various colors or finishes can be applied as desired. In other embodiments, possibly a recycled PVC can be used, or other materials such as metals, plastics, and any appropriate material. Trim body 286 in FIG. 4 can be, in a preferred embodiment, recycled PVC. Trim body 286 will not be seen by the public/customers so its appearance is not as important as skin 284. Therefore recycled PVC is a good option. However, other embodiments can comprise virgin PVC, or other materials, such as metals, plastics or other materials as desired.

Foam 250 in FIG. 4 has been described as polyurethane foam. This is a preferred embodiment. However, other embodiments may comprise different foams or different materials as appropriate.

End sheets 240 of FIG. 4 can be comprised of metal in a preferred embodiment (such as galvanized aluminum). However, other embodiments can comprise other metals, plastics or other materials.

Shape pattern 270 in FIG. 4 can take a variety of forms. FIGS. 5A-5D display a variety of embodiments that the shape pattern 270 can take. FIGS. 5A-5D display end panel embodiments 200, comprising end sheets 240, trim 280 (comprising skin 284 and trim body 286), foam 250, and shape pattern 270. As can be seen, shape pattern 270 can take a variety of forms, shapes and sizes. The pattern can be repeating, or it can be several different shapes, or just a single shape. What is desired is that polyurethane liquid flow into the shape pattern 270 during pouring/injection, and that when the polyurethane dries into a foam that a strong connection be formed between end sheets 240, foam 250, and trim 280. Interlocking parts and interference fits can be created by this process.

Figure 6:
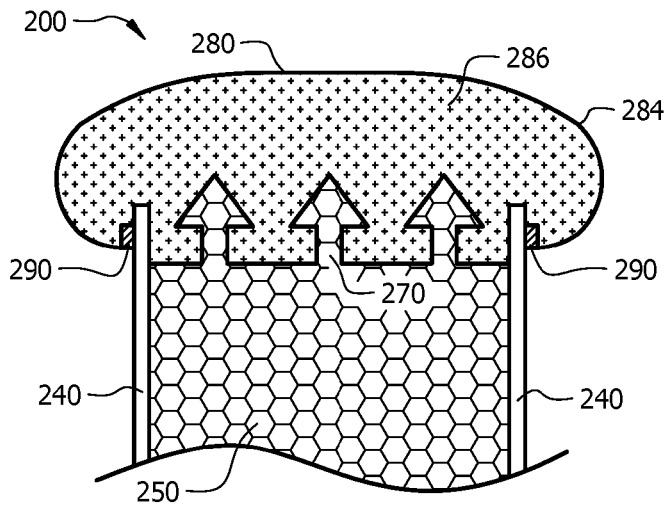
FIG. 6 is a diagram of an end panel embodiment under the present disclosure.

Another embodiment under the present disclosure can comprise additional features to seal or protect the bond between the trim and the end sheets. Such an embodiment can be seen in FIG. 6. End panel trim 200 comprise end sheets 240, trim 280 (comprising skin 284 and trim body 286), foam 250, and shape pattern 270. Bumpers 290 can be disposed along the outer edge of the end sheets 240 such that they abut the trim body 286 and/or skin 284. Bumpers 290 can be located inside or outside of trim body 286 and skin 284. When located inside, bumpers 290 can provide an interference fit, so that the bond between the trim body 286 (and skin 284) and the end sheets 240 is strengthened. Bumpers can also help prevent the entry of foreign substances, such as water, into the trim 280. Bumpers located outside of the trim body 286, abutting the skin 284, can also help protect against the entry of foreign substances. Bumpers 290 can comprise a rubber, plastic, or another appropriate material for sealing the trim 280.

The polyurethane foam used within the panels of the present disclosure can comprise standard polyurethane than can be poured and/or injected in liquid form, as known in the prior art. The liquid then cools and forms a foam. Other materials with similar properties (e.g. a hard setting foam/liquid) could also be used.

The trim skin and trim body can comprise PVC. In a preferred embodiment the skin is virgin PVC and the trim body is recycled PVC. The combined skin and body can be constructed through a co-extrusion process. Other embodiments could use virgin PVC for both the skin and body, or recycled PVC for both the skin and body. Such embodiments could use a single extrusion process.

Figure 7:
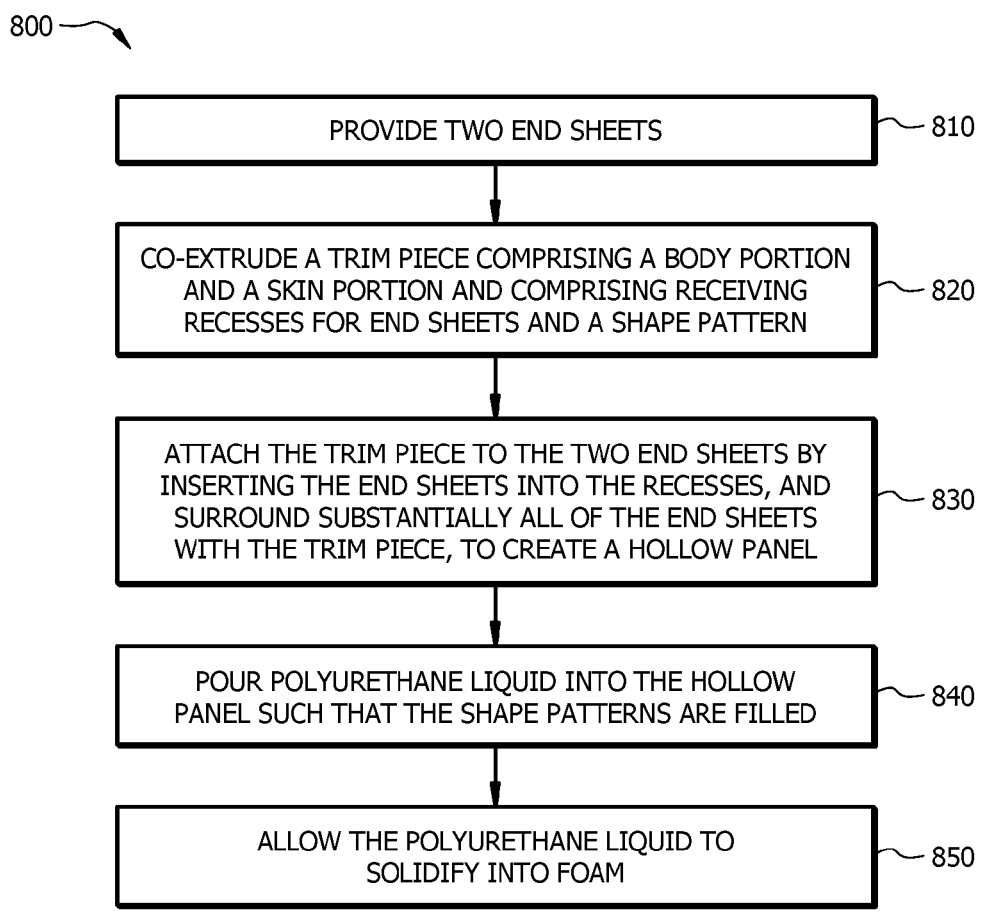
FIG. 7 is a diagram of a method embodiment under the present disclosure.

FIG. 7 displays a possible method embodiment 800 for creating an end panel under the present disclosure. At 810, two end sheets are provided. At 820, a trim piece is extruded that comprises a body portion and a skin portion, and further comprises receiving recesses for end sheets and also a shape pattern. At 830, the trim piece is attached to the two end sheets by inserting the end sheets into the recesses, and surrounding substantially all of the end sheets' perimeter with the trim piece to create a hollow panel. At 840, polyurethane liquid is poured or injected into the hollow panel such that the shape patterns are filled. At 850, the polyurethane liquid is allowed to solidify into foam.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of constructing an end panel for use in a refrigerated display case, the method comprising:
   providing two end sheets, the two end sheets being parallel and spaced apart from each other, each end sheet having an outer-facing surface, an inner-facing surface and a perimeter;
   co-extruding a trim body and a trim skin such that the trim body and trim skin are permanently affixed, the trim body comprising two slots formed therein, the two slots configured to receive the two end sheets, wherein the two slots are sized so that for each of the two end sheets its perimeter can snap into one of the two slots formed in the trim body, and wherein a lateral width of the trim body extends beyond the outer-facing surfacing of the two end sheets;
   forming a plurality of shape patterns in the trim body, wherein the plurality of shape patterns extend into the trim body further than the two slots extend into the trim body and wherein the plurality of shape patterns is positioned between the two end sheets when the end panel is assembled;
   inserting the two end sheets into respective slots in the trim body such that the two end sheets snap into the respective slot, wherein the trim body and two end sheets form an interior region therebetween;
   injecting insulating, polyurethane liquid into the interior region such that the insulating, polyurethane liquid fills the interior region including the plurality of shape patterns; and
   allowing the insulating, polyurethane liquid to solidify into an insulating, polyurethane foam, to at least assist in bonding the two end sheets together and to further secure the trim body to the two end sheets.

2. The method of claim 1 further comprising placing a plurality of wood pieces between the two end sheets.

3. The method of claim 1 wherein the shape pattern comprises a cross.

4. The method of claim 1, further comprising disposing two bumpers along the perimeter of each of the two sheets such that the two bumpers abut the trim body.

5. The method of claim 1, further comprising disposing two bumpers along the perimeter of each of the two sheets such that the two bumpers are located inside the trim body when assembled and form an interference fit between a respective end sheet and at least a portion of the respective slot.

6. The method of claim 1, wherein each of the plurality of shape patterns comprise at least one selected from the group consisting of an arrow shape, an upside down L shape, a cross, a truncated triangle, and a lollipop shape.

7. A method of constructing an end panel for use in a refrigerated display case, the method comprising:
   providing two end sheets, the two end sheets being parallel and spaced apart from each other, each end sheet having an outer-facing surface, an inner-facing surface and an end that extends along a perimeter;
   providing a snap trim, wherein the snap trim comprises:
      a trim body, the trim body formed with two slots extending into the trim body, wherein each slot is sized and configured to receive and form a snap fit with one of the ends of the two end sheets,
      a trim skin covering an exterior of the trim body, wherein the trim skin is not formed from a same material as the trim body,
      wherein the trim body extends beyond the outer-facing surface of each of the two end sheets so that a lateral width of the trim body is greater than a distance separating the two end sheets, and
      wherein the trim body is formed with a plurality of shape patterns that extend into the trim body;
   inserting the end of each of the two end sheets into the two slots formed in the trim body to form a snap fit along the perimeter of the two end sheets and to form an interior region formed by the inner-facing surface of each of the two end sheets and the trim body;
   injecting liquid polyurethane into the interior region including the shaped patterns of the trim body; and
   allowing time for the liquid polyurethane to dry and harden to form polyurethane foam in the interior region including the shaped patterns.

8. The method of claim 7, wherein each of the plurality of shaped patterns comprise at least one selected from the group consisting of an arrow shape, an upside down L shape, a cross, a truncated triangle, and a lollipop shape.

9. The method of claim 7, wherein each of the two slots of the trim body is stepped to have a wider portion at an opening of the slot, and further comprising disposing bumpers into each of the two slots to form an interference fit between the end of each sheet and at least a portion of its respective slot.

* * * * *